United States Patent [19]

Kluger

[11] 4,243,124
[45] Jan. 6, 1981

[54] AUTOMATIC NON-SERVO BRAKE ADJUSTER

[75] Inventor: Michael A. Kluger, South Bend, Ind.

[73] Assignee: The Bendix Corporation, Southfield, Mich.

[21] Appl. No.: 973,468

[22] Filed: Dec. 26, 1978

[51] Int. Cl.² ............................................. F16D 65/56
[52] U.S. Cl. ........................... 188/79.5 P; 188/196 D; 188/196 F
[58] Field of Search .................. 188/79.5 P, 79.5 GT, 188/79.5 GE, 196 F, 196 D

[56] References Cited

U.S. PATENT DOCUMENTS

| | | | |
|---|---|---|---|
| 2,191,429 | 2/1940 | Jenkins et al. | 188/196 F |
| 2,216,861 | 10/1940 | Swift | 188/79.5 GT |
| 2,222,858 | 11/1940 | Ryan | 188/79.5 GT |
| 2,255,260 | 9/1941 | Loweke | 188/79.5 GT |
| 2,493,993 | 1/1950 | Neale | 188/79.5 P |
| 2,730,205 | 1/1956 | Bauman | 188/196 F |
| 2,775,321 | 12/1956 | Phillips | 188/196 F |
| 3,339,678 | 9/1967 | Burnett | 188/79.5 P |
| 3,556,263 | 1/1971 | Wieger | 188/79.5 GT |
| 3,576,235 | 4/1971 | Bolenbaugh | 188/79.5 GE |
| 3,680,664 | 8/1972 | Farr | 188/196 D |

FOREIGN PATENT DOCUMENTS 1430367 2/1969 Fed. Rep. of Germany ....... 188/196 F

*Primary Examiner*—Edward R. Kazenske
*Attorney, Agent, or Firm*—Paul David Schoenle; Ken C. Decker

[57] ABSTRACT

An improved drum brake adjuster includes an adjustable strut with threadably engaged parts disposed between a pair of brake shoes to maintain a controlled spacing between the brake shoes. The adjuster includes an extendible member engaging one of the brake shoes and extending to lengthen the strut in response to the force of an adjusting spring. A pivot member engages the extendible member and the other brake shoe. The adjuster also includes a resilient member and a clutch device disposed between the extendible member and the pivot member. The resilient member and the clutch device cooperate to prevent change in the length of the strut unless brake lining wear occurs.

2 Claims, 5 Drawing Figures

AUTOMATIC NON-SERVO BRAKE ADJUSTER

BACKGROUND OF THE INVENTION

This invention relates to an automatic non-servo drum brake lining wear adjuster. Current market demands indicate a need for a unitized, automatic adjuster mechanism. Specifically, this invention consists of an adjustable strut comprised of a screw, nut, pivot, Belleville washer, cone clutch and spring. It is desirable that such a device provide continuous adjustment during both forward and reverse braking, incorporate the parking brake strut function, and utilize parts already existing in high volume.

SUMMARY OF THE INVENTION

It is an object of this invention to provide a unitized, automatic adjuster mechanism for a non-servo drum brake to control the spacing between the brake shoes and the brake drum as the linings wear.

It is an object of this invention to provide a strut which performs both the parking brake strut function and the brake adjustment function.

Another object of this invention is to provide for containment of a failed adjuster in its installed position by the shoe web and adjuster configuration, thus maintaining parking brake capabilities.

Other objects are to provide for continuous adjustment during forward and reverse service brake application and to employ adjuster parts presently available in high volume.

DETAILED DESCRIPTION

Figure 1:
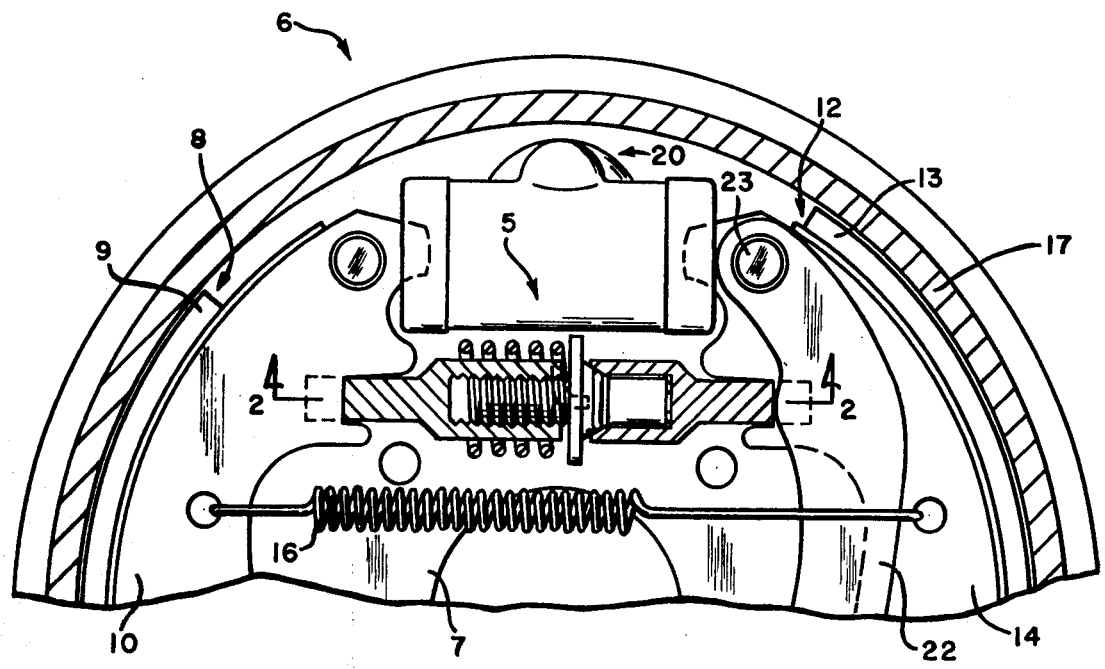
FIG. 1 is a fragmentary cross-sectional view of a drum brake assembly having an automatic adjuster made pursuant to my invention.

Referring now to the drawings and specifically to FIG. 1, a non-servo drum brake 6 includes a backing plate 7 which carries a pair of brake shoes 8 and 12. Brake shoes 8, 12 include portions carrying friction linings 9 and 13, and transversely extending webs 10 and 14. Conventional torque-absorbing means (not shown) are disposed between one pair of adjoining brake shoe ends. A service brake actuator or wheel cylinder 20 is disposed between the opposite ends of the shoes 8, 12 and actuates the brake by forcing the shoes 8 and 12 away from each other into engagement with a brake drum 17. A return spring 16 pulls the shoes 8 and 12 toward each other when the brake is released. A parking brake lever 22 is pivotally attached to brake shoe web 14 by pivot 23. An extendible adjuster strut 5 is disposed between the brake shoes. The strut 5 cooperates to maintain a controlled spacing between the brake shoes 8 and 12 and the drum as the linings 9 and 13 wear. The parking brake lever 22 engages one end of the strut 5, as will be more completely described hereinafter.

Figure 2:
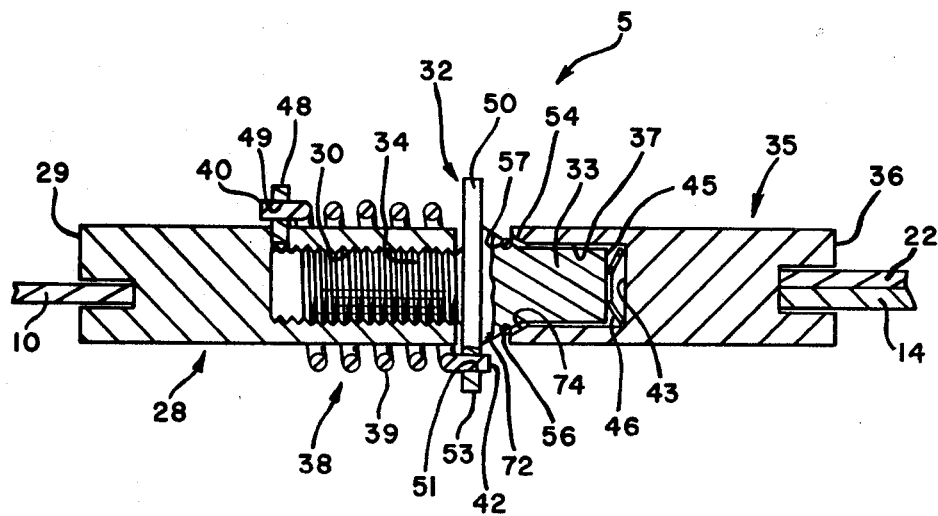
FIG. 2 is an enlarged fragmentary cross-sectional view taken along line 2—2 of FIG. 1.

Referring now to FIG. 2, in the preferred embodiment, the adjustable strut 5 is comprised of an extendible member having a nut 28, screw 32, and a pivot member 35. The nut 28 has a bifurcated end 29 which engages a portion of brake shoe web 10, and a female threaded portion 30 which threadably engages the male threaded portion 34 of screw 32. Screw 32 includes a cylindrical stem 33 with a uniform diameter extending axially away from the threaded portion 34. The cylindrical stem 33 also includes a unitary planer end face 45 which faces axially away from nut member 28. The base of stem 33 comprises an outwardly facing frustoconical clutch surface 72. An O-ring seal 56 is located in an annular groove 57 in the clutch surface 72. A radially extending flange portion 50 is disposed axially between threaded portion 34 and the base of stem portion 33 of screw 32.

An adjusting torsional spring 38 includes a coil portion 39 which circumscribes the threaded portions 30 and 34 of nut 28 and screw 32. A spring stop 48 projects from the surface of nut 28. A bore 49 in spring stop 48 receives one end 40 of torsion spring 38. A bore 51 in flange 50 of screw 32 receives the other end 42 of torsion spring 38 and comprises spring stop 53. Torsion spring 38 is biased to rotate screw 32 out of nut 28 to elongate the adjustable strut 5.

Pivot member 35 includes a bifurcated end 36 which engages adjacent portions of the parking lever 22 and brake shoe web 14. A blind axial bore 37 of uniform diameter in pivot 35 receives the cylindrical stem 33 of the screw 32. Blind axial bore 37 terminates in a unitary planer axially facing bottom face 43 which is parallel to end face 45 of stem 33. Parallel faces 45 and 43 define a space therebetween. A Belleville washer 46 is disposed within the bore 37 in the space so that it is engageable with end face 45 of screw stem 33 and bottom face 43 of pivot bore 37. The Belleville washer is biased to urge pivot 35 away from screw 32. The other end 54 of pivot 35 includes an inwardly facing annular frustoconical clutch surface 74 which cooperates with the frustoconical clutch surface 72 and the seal 56. Clutch surfaces 72 and 74 engage each other when the Belleville washer is compressed. The return spring 16, the Belleville washer 46 and the torsion spring 38 are selected so that the force of the return spring 16 is greater than the force of the Belleville washer 46, the which in turn, is greater than the force of the torsional spring 38.

Figure 3:
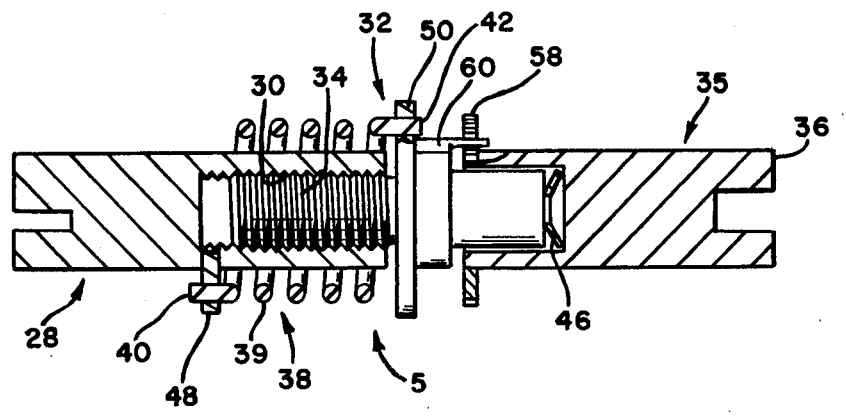
FIGS. 3, 4, and 5 are enlarged fragmentary cross-sectional views similar to FIG. 2, but showing alternate embodiments of the invention.

In the alternate embodiment of FIG. 3 a vernier ratchet 58 and a flexible finger 60 are substituted for clutch surfaces 72 and 74. Ratchet 58 extends from pivot 35 on the end of the pivot opposite its bifurcated end 36. Flexible finger 60 extends out from screw flange 50 to engage ratchet 58. All other parts are similar to those illustrated in FIGS. 1 and 2.

Figure 4:
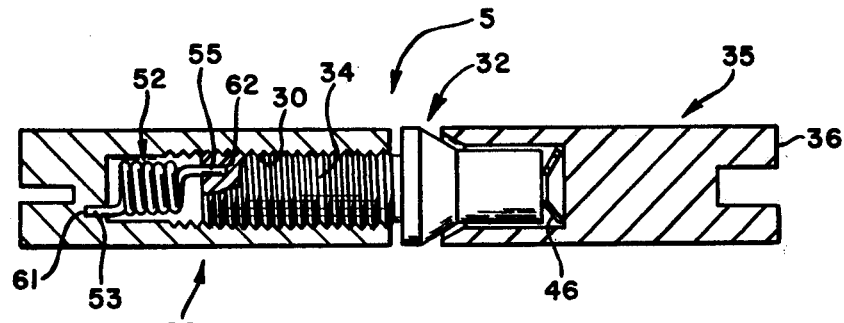

In the alternate embodiment illustrated in FIG. 4 the torsion spring 52 is disposed within nut 28. Spring stop 61 is located in the interior of nut 28 and spring stop 62 is located in the portion of screw 32 which extends into nut 28. Inner torsion spring ends 53 and 55 engage spring stops 61 and 62, respectively. All other parts are similar to those illustrated in FIGS. 1 and 2.

Figure 5:
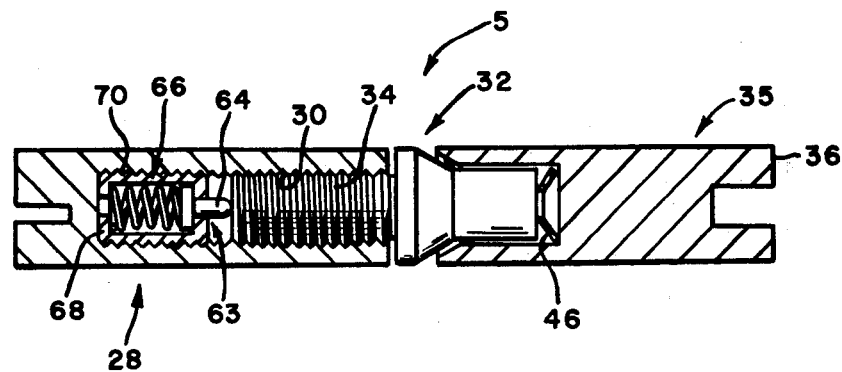

In the alternate embodiment illustrated in FIG. 5, the torsional spring 38 is replaced by a spring loaded indicator plunger 63 such as are available from Vlier. Spring loaded plunger 63 includes a case 68 with external threads 70 which is screwed into nut 28. A compression spring 66 is located within case 68 and is biased to urge plunger 64 into screw 32 and thus rotate screw 32 out of nut 28. All other parts are similar to those illustrated in FIGS. 1 and 2.

MODE OF OPERATION

The preferred embodiment illustrated in FIGS. 1 and 2 operates to adjust the position of the brake shoes only during a service brake application. Normally, when the brake is released, the return spring 16 pulls the brake shoes 8 and 12 toward each other and the shoe webs 10 and 14 cause pivot 35 to move toward screw 32 to compress Belleville washer 46. The thread friction between screw 32 and nut 28 and the rotational force of torsion spring 38 prevents screw 32 from rotating back into nut 28 as the Belleville washer is compressed. Since the force of the return spring 16 is greater than the force of the Belleville washer 46, the Belleville washer 46 will be compressed so that pivot clutch surface 74 engages screw clutch surface 72. Clutch surfaces 72 and 74 engage to prevent the rotation of screw 32 into nut 28 under the compressive force of the return spring. Pivot clutch surface 74 also engages O-ring seal 56 to increase the friction of the clutch and to seal the mechanism from contamination.

When a service brake application is effected, the wheel cylinder 20 is pressurized, causing the shoes 8 and 12 to separate so that the force of the return spring 16 no longer acts against the strut 5. The Belleville washer 46 relaxes and clutch surfaces 72 and 74 separate from each other. If brake lining wear is insufficient to require adjustment of the strut 5, the Belleville washer 46 never fully relaxes so that the Belleville spring force against screw 32 prevents screw 32 from rotating out of nut 28, and no adjustment occurs. However, as lining wear increases, a point is eventually reached where the shoes 8 and 12 separate sufficiently so that shoe webs 10 and 14 may move away from the corresponding surfaces of nut 28 and pivot 35. This allows the Belleville washer 46 to fully relax. When this happens the Belleville washer 46 no longer exerts a compressive force against screw 32. The torsion spring 38 then rotates the screw 32 out of the nut 28. The screw 32 rotates to lengthen strut 5 until nut 28 and pivot 35 re-engage brake shoes webs 10 and 14. At this point, screw 32 begins to compress Belleville washer 46 against pivot 35. However, further rotation of screw 32 out of nut 28 is prevented because the force exerted by the Belleville washer and the thread friction is greater than the rotational force of torsion spring 38. During parking brake application the force exerted through the parking lever is carried through the strut 5 so that the Belleville washer 46 cannot relax and clutch surfaces 72 and 74 remain engaged, so that no adjustment occurs. The strut 5 acts as a rigid member and performs the parking brake strut function.

In the alternate embodiment illustrated in FIG. 3, the flexible finger 60 engages ratchet 58 to prevent the screw 32 from rotating back into nut 28, but the ratchet and finger cooperate to permit screw 32 to rotate out of nut 28 to lengthen strut 5 as brake lining wear occurs during service brake application.

The operation of the interior torsion spring 52 of FIG. 4 is identical to the operation of the external torsion spring 38 of FIGS. 1, 2 and 3.

In the embodiment illustrated in FIG. 5, the screw 32 rotates out of nut 28 to elongate strut 5 just as it did in the previous embodiments. However, screw 32 moves in response to the longitudinal force exerted by spring plunger 63, rather than the rotational force exerted by torsional springs 38 or 52.

I claim:

1. In a drum brake having a backing plate, a pair of brake shoes with friction linings and carried by the backing plate, a return spring for biasing the brake shoes toward each other, service brake actuator means for urging the brake shoes to a braking position, and a parking lever pivotally attached to one of the brake shoes for urging the brake shoes to a braking position, an adjustable strut for maintaining a controlled clearance between the linings and the drum, the strut comprising:

a nut member with an internally threaded portion and a bifurcated end portion for receiving one of the brake shoes;

a screw member with an externally threaded portion received by the threaded portion of the nut member, a projecting portion extending axially away from the threaded portion and a radially extending flange portion disposed between the threaded and projecting portions, the projecting portion comprising a cylindrical stem with a uniform diameter and with a unitary planer end face facing axially away from the nut member, the projecting portion also comprising a base portion adjacent the flange, the base portion defining an outwardly facing frustoconical clutch surface;

a torsion spring circumscribing the threaded portions of the nut and screw members, the torsion spring having a first end anchored to the nut member and a second end anchored to the flange of the screw member, the torsion spring being biased to rotate the screw member out of the nut member to lengthen the strut;

a pivot member with a bifurcated end portion for receiving the parking lever and the other brake shoe, and having a blind axial bore with a uniform diameter for receiving the stem of the screw member, the bore terminating in a unitary planer axially facing bottom face parallel to the stem end face, the bottom face and the end face of the stem cooperating to define a space therebetween, the pivot member also comprising an inwardly facing frustoconical clutch surface engageable with the screw member clutch surface; and a resilient member comprising a Belleville washer disposed within the space between the bore bottom face and the stem end face, engageable with the bottom and end faces and biased to resist rotation of the screw member out of the nut member, the clutch surfaces engaging each other to prevent rotation of the screw member upon full compression of the Belleville washer between the end and bottom faces under the influence of the return spring when the brakes are released, the clutch surfaces also engaging upon full compression of the Belleville washer between the bottom and end faces to prevent rotation of the screw member into the nut member as the strut is compressed by the parking lever during a parking brake application so that the strut functions as a rigid parking brake strut, the clutch surfaces disengaging and the bottom and end faces separating to permit expansion of the Belleville washer and rotation of the screw member out of the nut member to lengthen the strut upon lining wear during a service brake application, the rotation of the screw member out of the nut member tending to compress the Belleville washer until the Belleville washer balances the torsion spring.

2. The strut of claim 1, wherein:

one of the clutch surfaces includes sealing means engageable with the other clutch surface when the Belleville washer is compressed.

* * * * *